(12) United States Patent
Vas'ko et al.

(10) Patent No.: US 7,369,360 B2
(45) Date of Patent: May 6, 2008

(54) PERPENDICULAR RECORDING HEAD HAVING CONTROLLED PERMEABILITY AND SATURATION MOMENT

(75) Inventors: Vladyslav Alexandrovich Vas'ko, Apple Valley, MN (US); Alexander Mikhailovich Shukh, Savage, MN (US); Mark T. Kief, Lakeville, MN (US); Eric W. Singleton, Maple Plain, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 319 days.

(21) Appl. No.: 10/982,077

(22) Filed: Nov. 5, 2004

(65) Prior Publication Data

US 2006/0098336 A1  May 11, 2006

(51) Int. Cl.
G11B 5/147 (2006.01)
(52) U.S. Cl. .................................... 360/126
(58) Field of Classification Search ............... None
See application file for complete search history.

(56) References Cited

U.S. PATENT DOCUMENTS

| | | | | |
|---|---|---|---|---|
| 3,867,368 A * | 2/1975 | Lazzari | | 360/126 |
| 4,610,935 A * | 9/1986 | Kumasaka et al. | | 428/632 |
| 4,814,921 A | 3/1989 | Hamakawa et al. | | 360/126 |
| 5,018,038 A * | 5/1991 | Nakanishi | | 360/126 |
| 5,103,553 A * | 4/1992 | Mallary | | 29/603.13 |
| 5,132,859 A * | 7/1992 | Andricacos et al. | | 360/126 |
| 5,157,570 A * | 10/1992 | Shukovsky et al. | | 360/126 |
| 5,606,478 A * | 2/1997 | Chen et al. | | 360/126 |
| 5,612,098 A | 3/1997 | Tan et al. | | 427/529 |
| 5,792,547 A | 8/1998 | Liu et al. | | 428/212 |
| 5,864,450 A * | 1/1999 | Chen et al. | | 360/319 |
| 5,876,848 A | 3/1999 | Tan et al. | | 428/336 |
| 6,259,583 B1 * | 7/2001 | Fontana et al. | | 360/126 |
| 6,296,955 B1 * | 10/2001 | Hossain et al. | | 428/815.2 |
| 6,358,635 B1 * | 3/2002 | Min et al. | | 428/800 |
| 6,456,467 B1 * | 9/2002 | Mao et al. | | 360/319 |
| 6,628,478 B2 | 9/2003 | Gill | | 360/126 |
| 6,791,794 B2 * | 9/2004 | Honjo et al. | | 360/126 |
| 6,791,796 B2 | 9/2004 | Shukh et al. | | 360/126 |
| 6,813,115 B2 * | 11/2004 | Van der Heijden et al. | | 360/125 |
| 6,930,863 B2 * | 8/2005 | Biskeborn | | 360/319 |
| 7,057,837 B2 * | 6/2006 | Gill | | 360/55 |
| 7,180,705 B2 * | 2/2007 | Matono et al. | | 360/126 |

(Continued)

OTHER PUBLICATIONS

Unguri et al., J., Oscillatory exchange coupling in Fe/Au/Fe(100), J. Appl. Phys., vol. 75, No. 10, pp. 6437-6439, May 15, 1994.
Parkin, S., "Dramatic enhancement of interlayer exchange coupling and giant magnetoresistance in Ni81Fe19/Cu multilayers by addition of thin Co interface layers," Appl. Phys. Lett., vol. 61, No. 11, pp. 1358-1360, Sep. 14, 1992.

(Continued)

*Primary Examiner*—Angel Castro
(74) *Attorney, Agent, or Firm*—Leanne Taveggia Farrell; Westman, Champlin & Kelly, P.A.

(57) ABSTRACT

A method and apparatus having magnetic properties. The apparatus includes a main pole and a return pole spaced apart from the main pole. The return includes at least one multilayer block having a plurality of alternating layers of magnetic material and non-magnetic material. The return pole also includes a single magnetic material layer coupled to the at least one multilayer block. The magnetic material layer has a permeability that is greater than a permeability of the at least one multilayer block.

17 Claims, 6 Drawing Sheets

U.S. PATENT DOCUMENTS

| | | | |
|---|---|---|---|
| 2002/0027750 A1 | 3/2002 | Shukh et al. | 360/317 |
| 2002/0149886 A1 | 10/2002 | Gill | 360/317 |
| 2003/0002227 A1* | 1/2003 | Jarratt | 360/319 |
| 2003/0022023 A1 | 1/2003 | Carey et al. | 428/694 |
| 2004/0120074 A1* | 6/2004 | Okada et al. | 360/126 |
| 2006/0002015 A1* | 1/2006 | Gill et al. | 360/125 |
| 2006/0044680 A1* | 3/2006 | Liu et al. | 360/126 |

OTHER PUBLICATIONS

Parkin et al., S., "Oscillations in Exchange Coupling and Magnetoresistance in Metallic Superlattce Structures: Co/Ru, Co/Cr, and Fe/Cr", Physical Review Letters, vol. 64, No. 19, pp. 2304-2307, May 7, 1990.

* cited by examiner

PERPENDICULAR RECORDING HEAD HAVING CONTROLLED PERMEABILITY AND SATURATION MOMENT

FIELD OF THE INVENTION

The present invention relates generally to data storage systems. In particular, but not by limitation, the present invention relates to a device with magnetic properties.

BACKGROUND OF THE INVENTION

A typical disc drive includes a rigid housing that encloses a variety of disc drive components. The components include one or more rotating discs having data surfaces that are coated with a medium for storage of digital information in a plurality of circular, concentric data tracks. The discs are mounted on a spindle motor that causes the discs to spin and the data surfaces of the discs to pass under respective aerodynamic bearing disc head sliders. Sliders carry transducers which write information to and read information from the data surfaces of the discs.

Typically, transducers or heads include an inductive recording or write head for generating a magnetic field that aligns the magnetic moments of the recording layer of a magnetic medium to represent desired bits of data. In addition, transducers include a read element that is configured to read magnetic flux transitions recorded to data tracks on the medium which represent the bits of data. The magnetic flux from the recording medium causes a change in the electrical resistivity of the read element, which can be detected by passing a sense current through the read element and measuring a voltage across the read element. The voltage measurement can then be decoded to determine the recorded data.

Magnetic recording heads include both longitudinal and perpendicular recording techniques. Perpendicular recording is a form of magnetic recording in which magnetic moments representing bits of data are oriented perpendicularly to the surface of the recording layer of the recording medium, as opposed to longitudinally along a track of the medium as in the more traditional longitudinal recording technique.

Perpendicular magnetic write heads typically include main and return poles that are separated by a non-magnetic spacer. The main and return poles each extend from pole tips located at an air-bearing surface (ABS) to a back gap region. A back gap closure typically connects the main and return poles together at the back gap region to form a magnetically conductive path therebetween. A coil typically surrounds the back gap closure and is used to generate magnetic signals through the main and return poles in response to a current conducted therethrough. The magnetic signals are focused at the main pole tip such that they interact with a recording layer of a magnetic medium to orient its magnetic moments in an up or down direction. The return pole, however, even in the absence of current flowing through the coil, can generate an erasure field that could inadvertently erase or write over previously written data on the magnetic medium by reorienting magnetization in data patterns. Thus, a need exists to reduce these undesirable erasure effects.

SUMMARY OF THE INVENTION

The present invention is directed towards a method and apparatus which has magnetic properties. The apparatus includes a main pole and a return pole spaced apart from the main pole. The return pole includes at least one multilayer block having a plurality of alternating layers of magnetic material and non-magnetic material. The apparatus also includes a single magnetic material layer coupled to the at least one multilayer block. The magnetic material layer has a permeability that is greater than a permeability of the at least one multilayer block. In one embodiment of the present invention, the apparatus include a first return pole and a second return pole.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
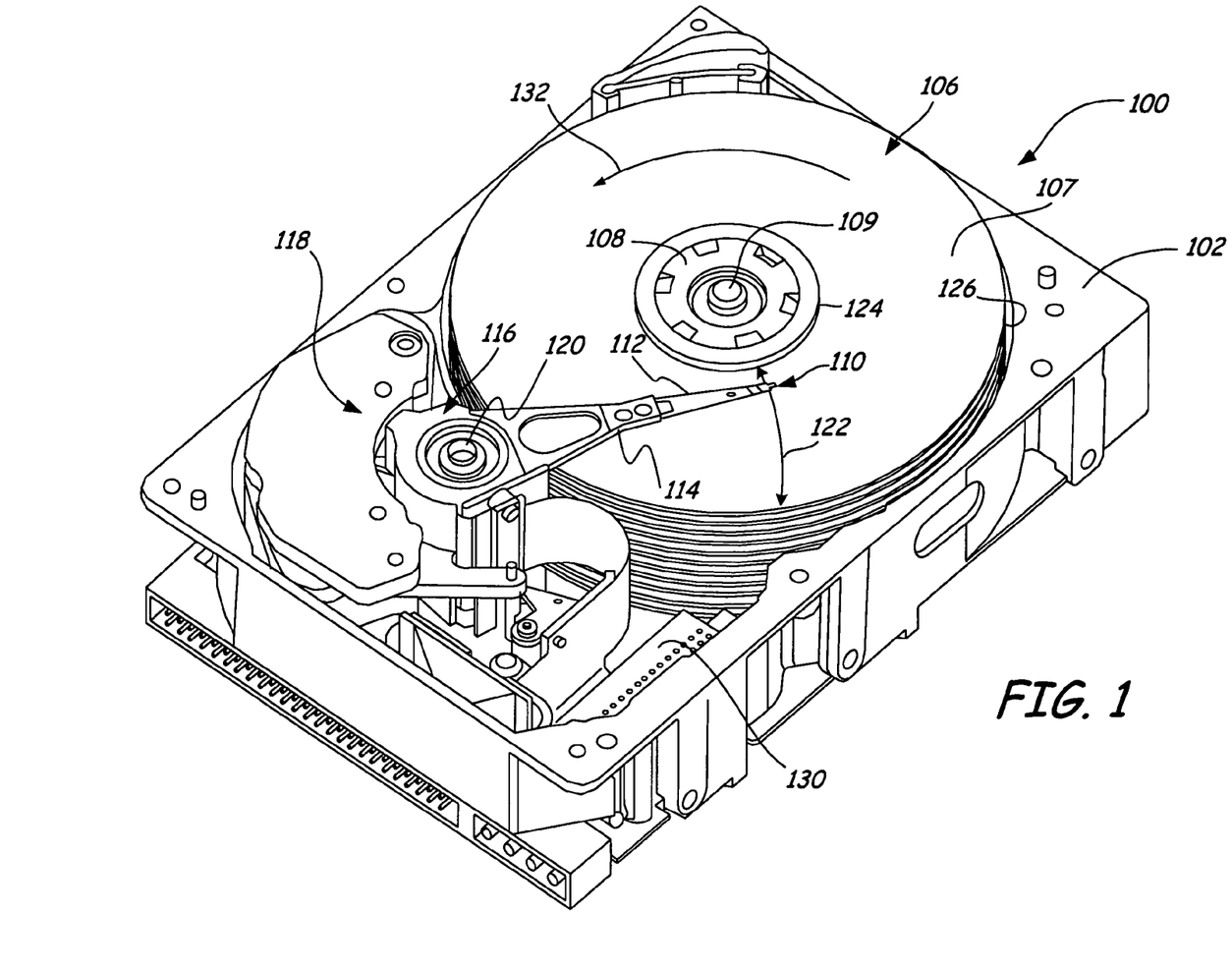
FIG. 1 is a perspective view of a disc drive.

FIG. 1 is a perspective view of a disc drive 100 that includes a housing with a base deck 102 and a top cover (not shown) in which embodiments of the present invention are useful. Disc drives are common data storage systems. Disc drive 100 further includes a disc pack 106, which is mounted on a spindle motor (not shown) by a disc clamp 108. Disc pack 106 can include one or more discs and is illustrated with a plurality of individual discs 107, which are mounted for co-rotation about an axis 109 in the direction indicated by arrow 132. Each disc surface has an associated slider 110 that carries read/write transducers for communication with a disc surface. In the example in FIG. 1, slider 110 is supported by suspension 112 that is in turn attached to track accessing arm 114 of an actuator mechanism 116. Actuator mechanism 116 is of the type known as a rotating moving coil actuator and includes a voice coil motor (VCM), shown generally at 118. VCM 118 rotates actuator 116 about pivot shaft 120 to position slider 110 over a desired data track along an arcuate path 122 between a disc inner diameter 124 and a disc outer diameter 126. Slider 110 is coupled to suspension 112 through a gimbal attachment which allows slider 110 to pitch and roll as it rides on an air-bearing surface (ABS) of disc 107. Slider 110 supports the transducers at a trailing edge. The transducers include separate reading and writing elements for reading data from, and recording data to disc 107.

During operation, as disc 107 rotates, air is dragged under the ABS of slider 110 in a direction approximately parallel to the tangential velocity of disc 107. As the air passes beneath the bearing surfaces, air compression along the air flow path causes the air pressure between the disc surface and the bearing surfaces to increase, which creates a hydrodynamic lifting force that counteracts a load force provided by suspension 112. This hydrodynamic lifting force causes the slider 110 to "fly" above, and in close proximity, to the disc surface of disc 107.

VCM 118 is driven by electronic circuitry 130 based on signals generated by transducers and a host computer (not shown). During operation, electronic circuitry 130 receives position information indicating a portion of disc 107 to be accessed. Electronic circuitry 130 receives the position information from an operator, from a host computer, or from another suitable controller. Based on the position information, electronic circuitry 130 provides a position signal to actuator mechanism 116. Once the transducers are appropriately positioned over a specified track on disc 107, electronic circuitry 130 then executes a desired read or write operation.

Figure 2:
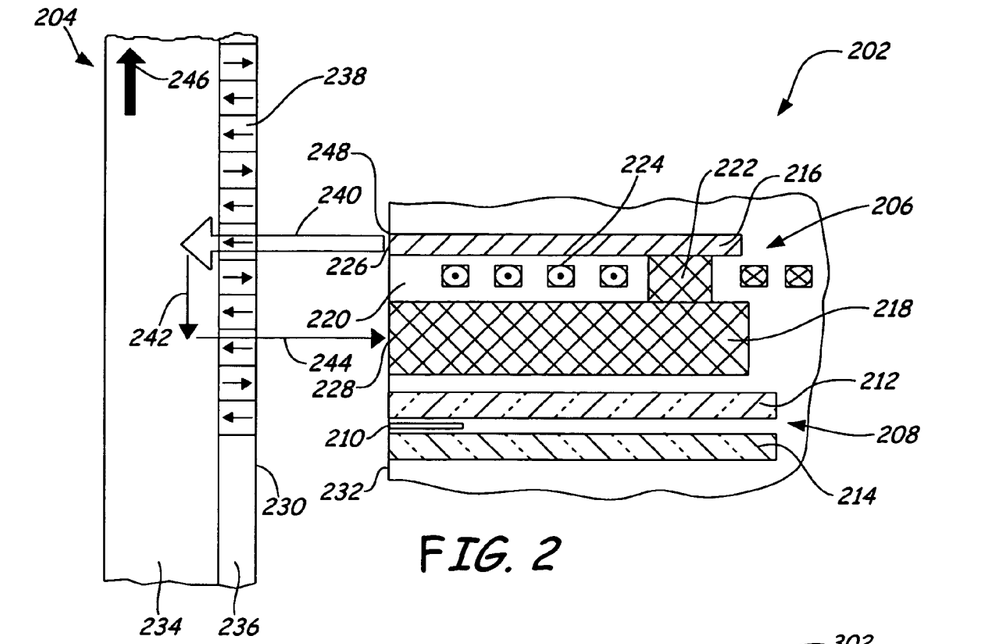
FIG. 2 illustrates a partial sectional view of an example read/write transducer for perpendicular recording to a medium.

FIG. 2 illustrates a partial sectional view of an example read/write transducer 202 for perpendicular recording to a medium 204 for use in the present invention. In FIG. 2, all spacing and insulating layers are omitted for clarity. Read/write transducer 202 includes a writing element 206 and a reading element 208 formed on a trailing edge of a slider (not shown in FIG. 2). Reading element 208 includes a read sensor 210 that is spaced between a top shield 212 and a bottom shield 214. Top and bottom shields 212 and 214 operate to isolate read sensor 210 from external magnetic fields that could affect sensing bits of data that have been recorded on medium 204.

Writing element 206 includes a writing main pole 216 and a return pole 218. Main and return poles 216 and 218 are separated a non-magnetic spacer 220. Main pole 216 and return pole 218 are connected at a back gap closure 222. A conductive coil 224 extends between main pole 216 and return pole 218 and around back gap closure 222. An insulating material (not shown) electrically insulates conductive coil 224 from main and return poles 216 and 218. Main and return poles 216 and 218 include main and return pole tips 226 and 228, respectively, which face a surface 230 of medium 204 and form a portion of an air bearing surface (ABS) 232 of a slider. FIG. 2 illustrates reading element 208 having separate top and bottom shields 212 and 214 from writing element 206. However, it should be noted that in other read/write transducers, return pole 218 could operate as a top shield for reading element 208.

A magnetic circuit is formed in writing element 206 by main and return poles 216 and 218, back gap closure 222, and a soft magnetic layer 234 of medium 204 which underlays a hard magnetic or storage layer 236 having perpendicular orientation of magnetization. Storage layer 236 includes uniformly magnetized regions 238, each of which represent a bit of data in accordance with an up or down orientation. In operation, an electrical current is caused to flow in conductive coil 224, which induces a magnetic flux that is conducted through the magnetic circuit. The magnetic circuit causes the magnetic flux to travel vertically through the main pole tip 226 and storage layer 236 of the recording medium, as indicated by arrow 240. Next, the magnetic flux is directed horizontally through soft magnetic layer 234 of the recording medium, as indicated by arrow 242, then vertically back through storage layer 236 through return pole tip 228 of return pole 218, as indicated by arrow 244. Finally, the magnetic flux is conducted back to main pole 216 through back gap closure 222.

Main pole tip 226 is shaped to concentrate the magnetic flux traveling therethrough to such an extent that the orientation of magnetization in patterns 238 of storage layer 236 are forced into alignment with the writing magnetic field and, thus, cause bits of data to be recorded therein. In general, the magnetic field in storage layer 236 at main pole tip 226 must be twice the coercivity or saturation field of that layer. Medium 204 rotates in the direction indicated by arrow 246. A trailing edge 248 of main pole 216 operates as a "writing edge" that defines the transitions between bits of data recorded in storage layer 236, since the field generated at that edge is the last to define the magnetization orientation in the pattern 238.

Figure 3:
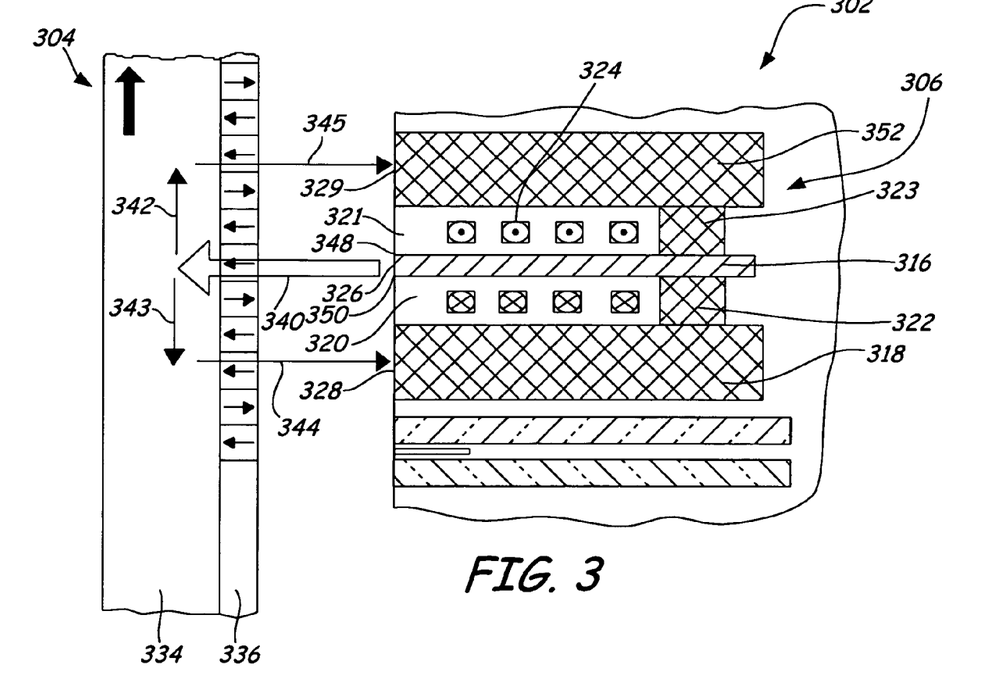
FIG. 3 illustrates a partial sectional view of an example read/write transducer for perpendicular recording to a medium.

FIG. 3 illustrates a partial sectional view of another example read/write transducer 302 for perpendicularly recording to a medium 304. Unlike read/write transducer 202 of FIG. 2, read/write transducer 302 includes a writing element 306 having a first return pole 318 and a second return pole 352. The intensity of a magnetic field returning into a first and a second return pole of the recording head is approximately twice as small as the intensity of a magnetic field returning into a single return pole. A smaller intensity decreases the likelihood of erasure by the return pole.

As illustrated in FIG. 3, first return pole 318, having a first return pole tip 328, is separated from main pole 316 by a first spacer 320 and connected at a first back gap closure 322. Main pole 316 includes a main pole tip 326 having a trailing edge 348 and a leading edge 350. First return pole 318 is spaced apart from leading edge 350 of main pole tip 326. Second return pole 352 is positioned on the opposite side of main pole 316 than first return pole 318. In particular, second return pole 352 is spaced apart from trailing edge 348 of main pole tip 326. Second return pole 352, having a second return pole tip 329, is separated from main pole 316 by a second spacer 321 and connected at a second back gap closure 323. A conductive coil 324 wraps around main pole 316 to extend between main pole 316 and first return pole 318 and between main pole 316 and return pole 352. An insulating material (not shown) electrically insulates conductive coil 324 from main pole 316 and return pole 318 and from main pole 316 and return pole 352. One of ordinary skill in the art should understand that other configurations of conductive coil 324 are possible. For example, conductive coil 324 could be two conductive coils. One coil could extend between first return pole 318 and main pole 316 and around back gap closure 322 and one coil could extend between second return pole 352 and main pole 316 and around back gap closure 323.

A magnetic circuit is formed in writing element 306 by main pole 316, first return pole 318, second return pole 352, back gap closures 322 and 323, and a soft magnetic layer 334 of medium 304 which underlays a hard magnetic or storage layer 336 having perpendicular orientation of magnetization. In operation, an electrical current is caused to flow in conductive coil 324, which induces a magnetic flux that is conducted through the magnetic circuit. The magnetic circuit causes the magnetic flux to travel vertically through the main pole tip 326 and storage layer 336 of the recording medium, as indicated by arrow 340. Next, the magnetic flux is directed horizontally through soft magnetic layer 334 of the recording medium, as indicated by arrows 342 and 343, then vertically back through storage layer 336 through first return pole tip 328 of first return pole 318 and through second return pole tip 329 of second return pole 352, as indicated by arrows 344 and 345. Finally, the magnetic flux is conducted back to main pole 316 through back gap closures 322 and 323.

Figure 4:
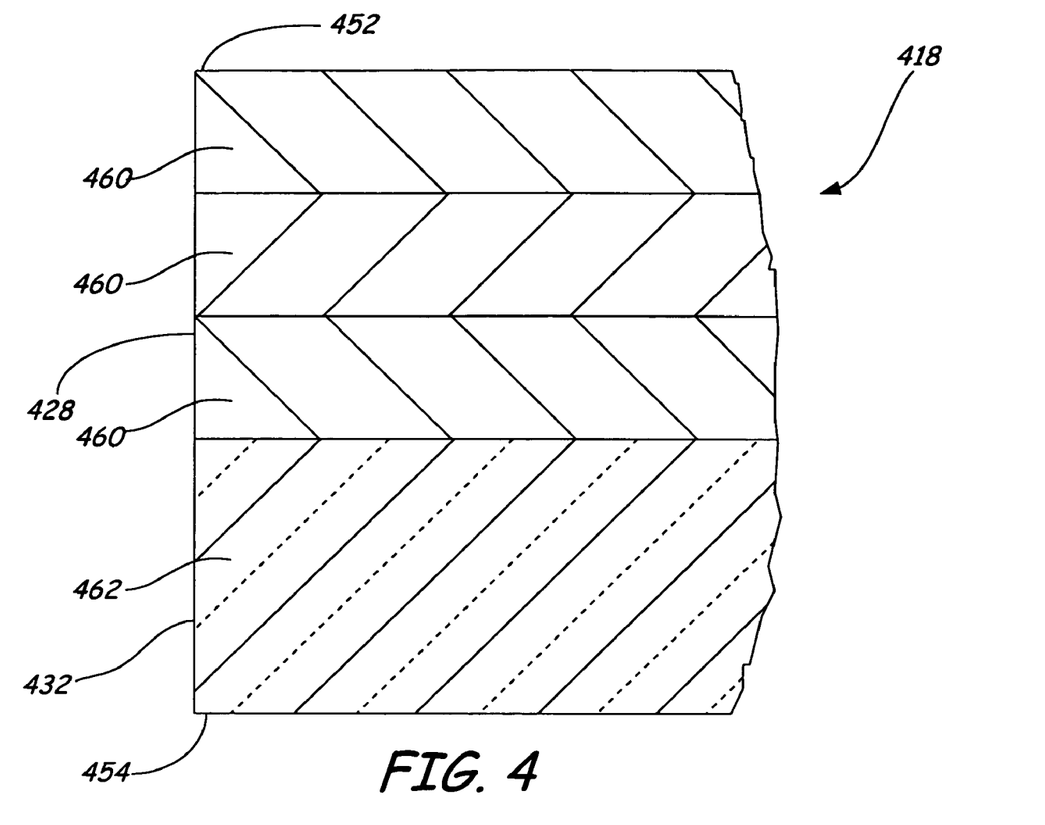
FIG. 4 illustrates an enlarged partial sectional view of a return pole in accordance with an embodiment of the present invention.

FIG. 4 illustrates an enlarged sectional view of a return pole 418 in accordance with an embodiment of the present invention. FIG. 4 illustrates return pole 418 having a return pole tip 428 along an air bearing surface 432. FIG. 4 also illustrates return pole 418 having a trailing edge 452 and a leading edge 454. Return pole 418 includes at least one multilayer block 460 and a single magnetic material layer 462. In the embodiment shown in FIG. 4, return pole 418 includes a plurality of multilayer blocks 460 that are coupled to a single magnetic material layer 462. However, it should be noted that return pole 418 can include a single multilayer block coupled to a single magnetic material layer. In addition, although FIG. 4 illustrates return pole 418, it should be recognized that the description of the return pole can extend to other types of devices having magnetic properties.

Although not illustrated in FIG. 4, return pole 418 is spaced apart from a main pole (not shown) at trailing edge 452. Therefore, multilayer blocks 460 are positioned closer to a main pole than single magnetic material layer 462. Single magnetic material layer 462 holds and aligns the magnetization (magnetic moments) of return pole 418 along the direction parallel to air bearing surface 432 by providing additional anisotropy direction to multilayers 460.

In FIG. 4, single magnetic material layer 462 is illustrated as comprising a single magnetic material. For example, single magnetic material layer 462 can include a nickel iron alloy, such as $Ni_{80}Fe_{20}$ or $Ni_{45}Fe_{55}$, cobalt nickel iron (CoNiFe) or cobalt iron (CoFe) alloys. Single magnetic material layer 462 has a permeability that is greater than that of multilayers 460. It should be noted, however, that single magnetic material layer 462 can include a plurality of different magnetic materials as long as single magnetic material layer 462 aligns the magnetic moments and holds the orientation of return pole 418. If single magnetic material layer 462 comprises multiple magnetic layers, then the magnetic material layer that is the furthest from the multilayer blocks 460 should have a permeability that is greater than any proceeding magnetic material closer to the multilayer blocks 460.

Figure 5:
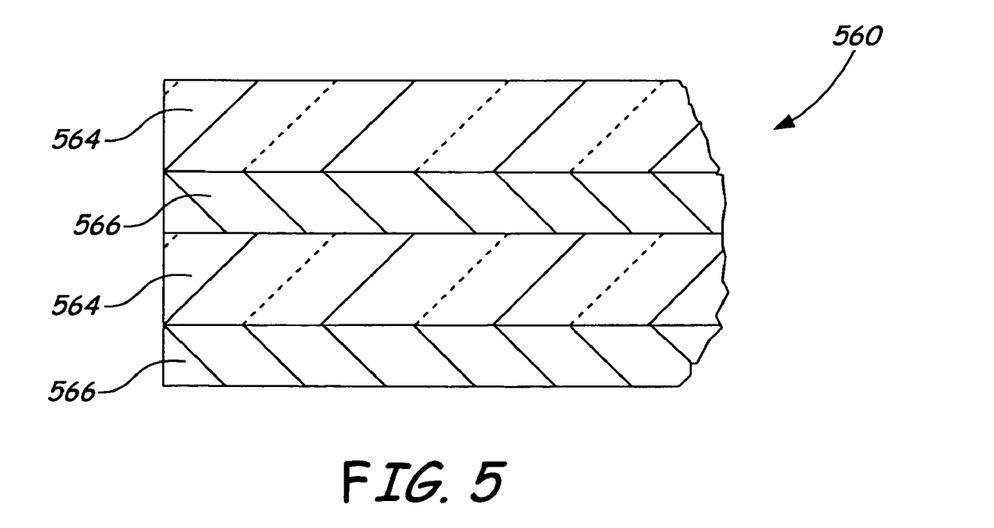
FIG. 5 illustrates an enlarged partial sectional view of a multilayer block in accordance with an embodiment of the present invention.

FIG. 5 illustrates an enlarged sectional view of a multilayer block 560 in accordance with an embodiment of the present invention. Multilayer block 560 is an antiferromagnetically (AFM) coupled multilayer block. Multilayer block 560 includes a plurality of alternating layers of magnetic material 564 and non-magnetic material 566. For example, magnetic material layers 564 can include a nickel iron alloy, such as $Ni_{80}Fe_{20}$ or $Ni_{45}Fe_{55}$, cobalt nickel iron (CoNiFe) or cobalt iron (CoFe) alloys. Non-magnetic material layers 566 can include ruthenium (Ru), copper (Cu) or chromium (Cr). At a minimum, each multilayer block 560 includes one non-magnetic material layer positioned between two magnetic material layers as illustrated in FIG. 6.

Figure 6:
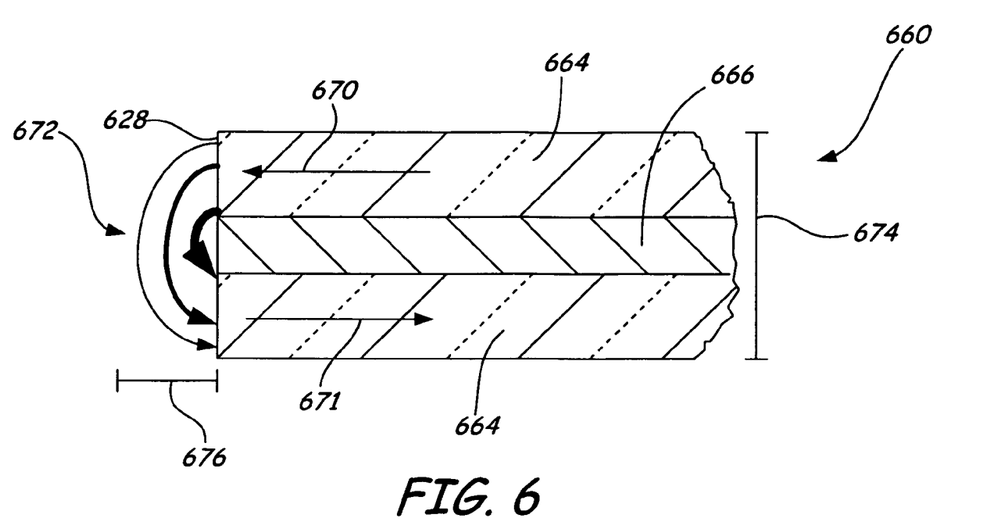
FIG. 6 illustrates an enlarged partial sectional view of a multilayer block in accordance with an embodiment of the present invention.

In FIG. 6, multilayer block 660 has a single non-magnetic material layer 666 positioned between two magnetic material layers 664. FIG. 6 also illustrates return pole tip 628 of the return pole in which multilayer block 660 is formed and a distance between return pole tip 628 and a medium (not illustrated in FIG. 6).

In absence of current, each magnetic material layer 664 includes a corresponding one of magnetization directions 670 and 671. FIG. 6 illustrates a magnetic field 672. Magnetic field 672 will decay considerably as distance 676 increases. In FIG. 6, the lines representing magnetic field 672 illustrate the magnitude of the magnetic field. The thickness of the lines illustrates that the magnetic field is stronger closer to return pole tip 628. It is important that the combined thickness 674 of magnetic layers 664 and non-magnetic layer 662 is minimized while still providing the acceptable average saturation magnetization and permeability due to an anti-ferromagnetic coupling profile.

In one embodiment, thickness 674 of multilayer block 660 is less than distance 676 between return pole tip 628 and the storage media. In another embodiment, the thickness of the plurality of multilayer blocks 460 illustrated in FIG. 4 is less than the distance between return pole tip 428 and the storage media. It should be noted, however, that multilayer block 660, 560 or blocks 460 are not limited to the above-described dimensions.

Referring back to FIG. 5, non-magnetic material layer 566 has a smaller thickness then magnetic material layer 564. However, those skilled in the art should recognized that the present invention is not limited to the relative thickness of non-magnetic material layer 566 and magnetic material layer 564. The thickness of non-magnetic material layer 566 and magnetic material layer 564 are determined based on the desired permeability of each multilayer block 560. For example, as illustrated in FIG. 4, it is desired that single magnetic material layer 462 have a permeability that is greater than multilayers 460. In particular, each multilayer block 460 that is closest to single magnetic material layer 462 has a permeability that is greater than each proceeding multilayer block 460, where the multilayer block having the least permeability is the multilayer block that is positioned closest to the main pole.

The following equations show that the permeability of a multilayer block is proportional to the thickness of magnetic material and non-magnetic material layers:

$$\mu \sim \frac{B_s}{H_{exchange}} \qquad \text{Equation 1}$$

where $$B_s = 4\pi M_s \qquad \text{Equation 2}$$

and $$B_s \sim B_{s,mag} t_{mag} (t_{mag} + t_{non-mag}) \qquad \text{Equation 3}$$

where $\mu$ is the permeability of a multilayer block, $B_s$ is the total saturation induction of a multilayer block, $H_{exchange}$ is the exchange field between two magnetic layers, $M_s$ is the magnetization saturation of a multilayer block, $B_{s,mag}$ is the saturation induction of a magnetic layer, $t_{mag}$ is the thickness of a magnetic layer and $t_{non-mag}$ is the thickness of a non-magnetic layer.

Using the concepts described in Equations 1-3, the thickness of magnetic material layer 564 and non-magnetic material layer 566 can vary depending on the saturation induction of the magnetic material. In one example, each magnetic material layer 564 that is closer to a single magnetic material layer can have a thickness greater than each proceeding magnetic material layer 564. In another example, each magnetic material layer 564 has a thickness that is greater than each non-magnetic material layer 566 (as shown in FIG. 5). In yet another example, each magnetic material layer 564 and each non-magnetic material layer 566 have similar thickness. Other thickness configurations are possible.

Figure 7:
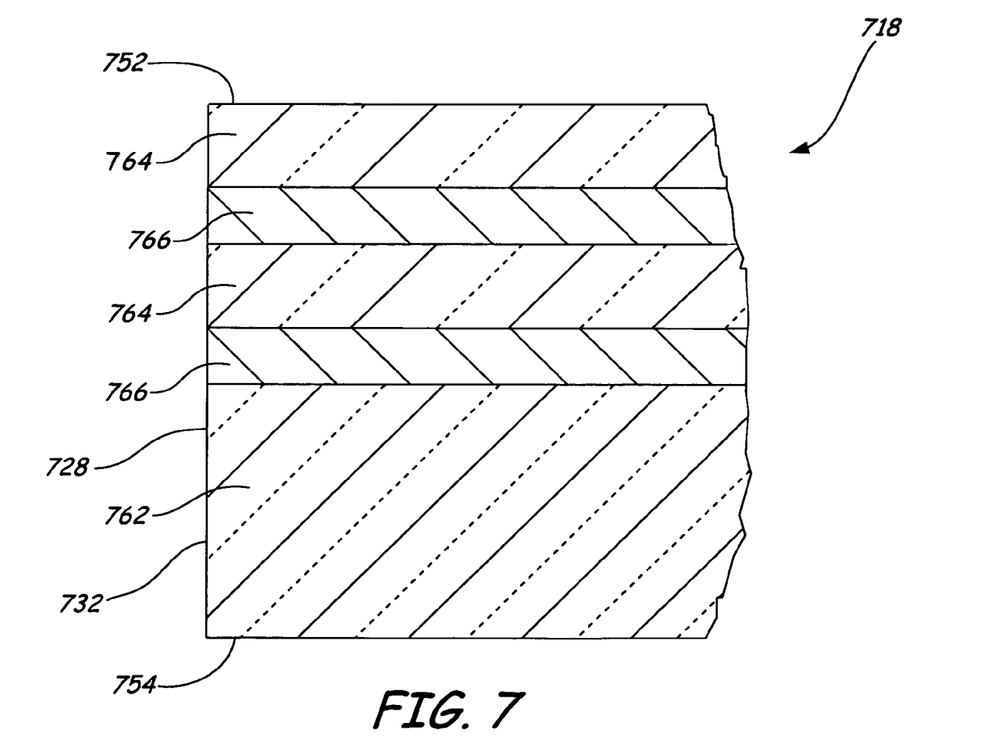
FIG. 7 illustrates an enlarged partial sectional view of a return pole in accordance with an embodiment of the present invention.

In accordance with another embodiment of the present invention, FIG. 7 illustrates an enlarged sectional view of a return pole 718. FIG. 7 illustrates return pole 718 having a return pole tip 728 along an air bearing surface 732. FIG. 7 also illustrates return pole 718 having a trailing edge 752 and a leading edge 754. Unlike the embodiment illustrated in FIG. 4, return pole 718 does not include multilayer blocks. In the alternative, return pole 718 includes a plurality of alternating magnetic material layers 764 and non-magnetic layers 766 that are coupled to a single magnetic material layer 762. At a minimum, the plurality of alternating magnetic layers 764 and non-magnetic layers 766 include one non-magnetic material layer 766 positioned between two magnetic material layers 764.

Although not illustrated in FIG. 7, return pole 718 is spaced apart from a main pole (not shown) at trailing edge 752. Therefore, the plurality of magnetic material layers 764 and non-magnetic material layers 766 are located closer to a main pole than single magnetic material layer 762. In addition, single magnetic material layer 762 has a permeability that is greater than the plurality of magnetic material layers 764 and non-magnetic material layers 766.

In one embodiment, the combined thickness of one non-magnetic material layer 766 and two magnetic material layers 764 can be less than the distance between return pole tip 728 and the storage media (not illustrated in FIG. 7). In another embodiment, the combined thickness of the plurality of alternating magnetic material layers 764 and 766 can be less than the distance between return pole tip 728 and the storage media. It should be noted, however, that magnetic material layers 764 and non-magnetic material layers 766 are not limited to the above-described dimensions.

Using the concepts described in Equations 1-3, the thickness of magnetic material layer 764 and non-magnetic material layer 766 can vary depending on the saturation induction of the magnetic material. In one example, each magnetic material layer 764 that is closer to single magnetic material layer 762 can have a thickness greater than each proceeding magnetic material layer 764. In another example, each magnetic material layer 764 has a thickness that is greater than each non-magnetic material layer 766 (as shown in FIG. 7). In yet another example, each magnetic material layer 764 and each non-magnetic material layer 766 have similar thickness. Other thickness configurations are possible.

Embodiments of the present invention minimize or eliminate undesirable erasure effects while the write element is either powered up or powered down. Erasure effects are minimized or eliminated when the write element is powered up because the desired profile of permeability and saturation moment of the return pole along the air bearing surface of the recording head relates to the thickness of the magnetic and nonmagnetic layers of each AFM-coupled magnetic multilayer block. Erasure effects are also minimized or eliminated when the write element is powered down because the adjacent magnetic layers are aligned parallel to the ABS. Furthermore, the magnetic layers are AFM-coupled, thus, the magnetic moments of the adjacent magnetic material layers are aligned in opposite directions, which substantially reduces the resultant magnetic field between the return pole tip and the storage media. The particular magnetic direction can be set by applying an external magnetic field, well exceeding coercivity, anisotropy, and effective AFM coupling, during deposition of all layers of the return pole, preferably along the air bearing surface and magnetic layer planes.

Figure 8:
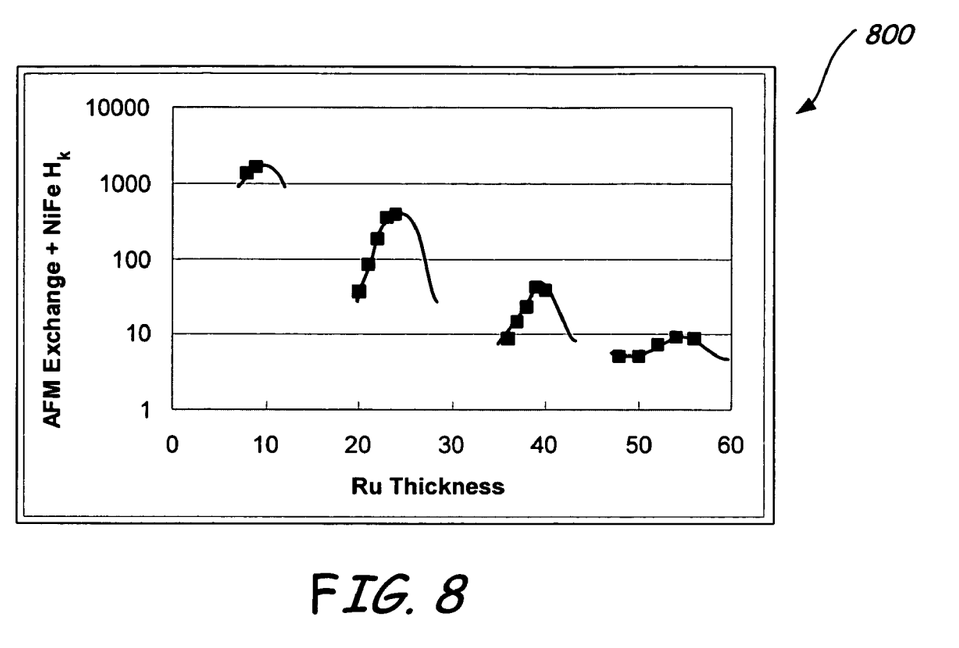
FIGS. 8-10 illustrate plots showing example data for a multilayer block relative to a thickness of a non-magnetic material layer in accordance with the present invention.
Figure 9:
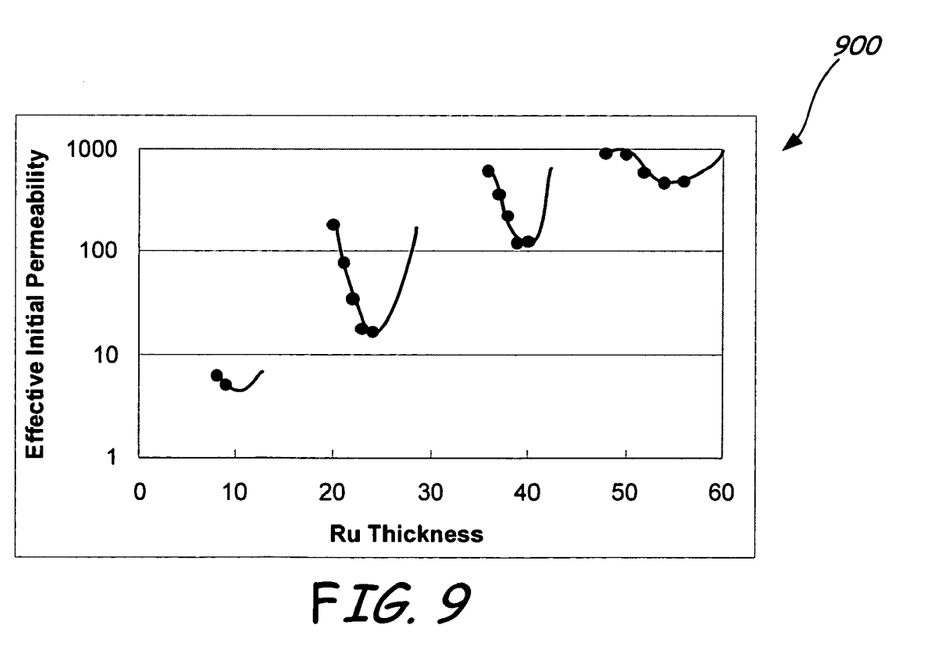
Figure 10:
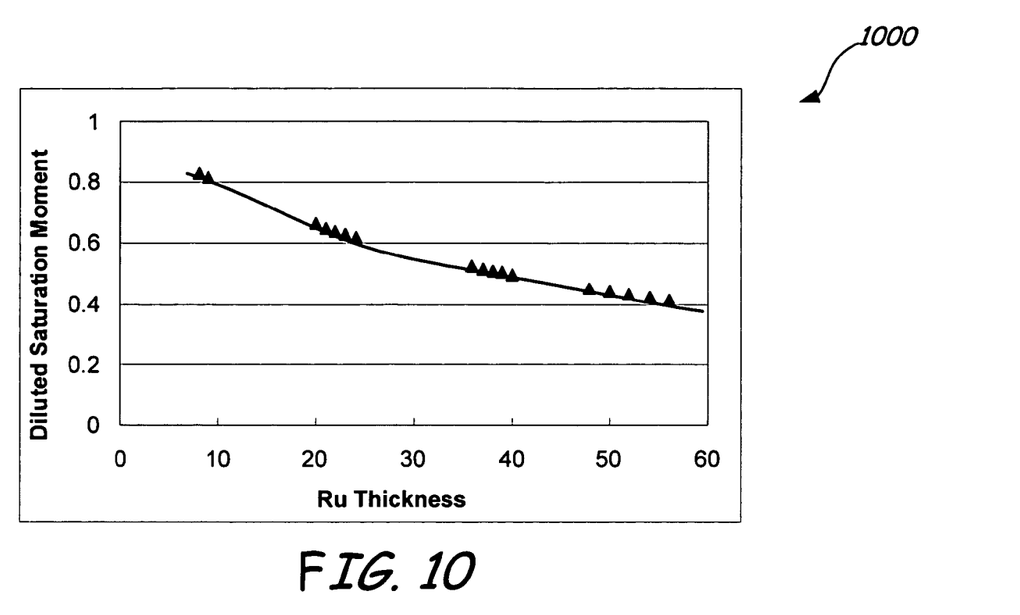

FIGS. 8-10 illustrate plots 800, 900 and 1000 showing example data of a multilayer block relative to a thickness of a non-magnetic material layer in accordance with the present invention. In plot 800, the example data is an exchange field of the magnetic material relative to a thickness of a non-magnetic material layer. The example non-magnetic material layer in plot 800 comprises ruthenium (Ru) and the magnetic material layer comprises some type of nickel iron alloy (NiFe). Plot 800 illustrates that the thicker the non-magnetic material, the less the exchange field of the magnetic material. In plot 900, the example data is the effective initial permeability of the multilayer block relative to the thickness of the non-magnetic material. Again, the example non-magnetic material comprises ruthenium (Ru). Plot 900 illustrates that the thicker the non-magnetic layer, the initial permeability of the multilayer block is higher. In plot 1000, the example data is the diluted saturation moment of a multilayer block relative to the non-magnetic material. Again, the example non-magnetic material comprises ruthenium (Ru). Plot 1000 illustrates that the thicker the non-magnetic material, the less the diluted saturation moment of the multilayer block.

Figure 11:
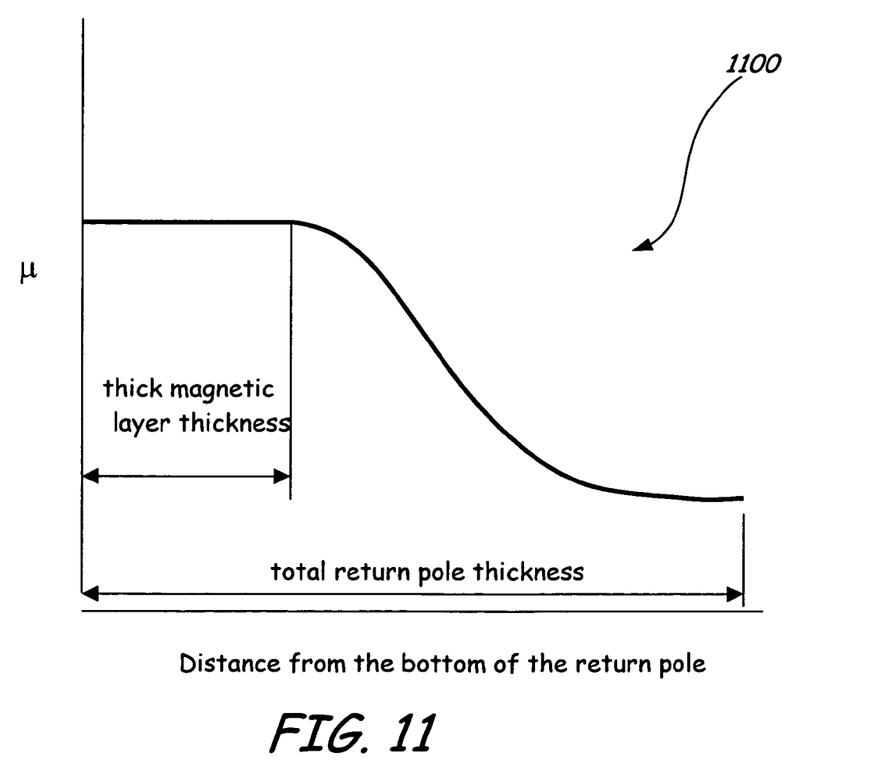
FIG. 11 illustrates a plot showing a permeability profile of a return pole in accordance with the present invention.

FIG. 11 illustrates a plot 1100 showing a permeability profile of a return pole in accordance with an embodiment of the present invention. Plot 1100 illustrates the permeability of the return pole relative to the distance from the bottom of the return pole or the furthest distance from either the trailing edge or the leading edge of the main pole to the closest distance to the main pole. Plot 1100 illustrates that the permeability of a point furthest from the main pole has a permeability greater than a point closest to the main pole. In particular, plot 1100 illustrates a magnetic material layer, such as layer 462, as having a constant permeability compared to the constant decrease in permeability across the remaining portion of the return pole. The constant decrease is represented by the multilayer block, such as multilayer blocks 460.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application a return pole while maintaining substantially the same functionality without departing from the scope and spirit of the present invention. In addition, although the preferred embodiment described herein is directed to a return pole, it will be appreciated by those skilled in the art that the teachings of the present invention can be applied to other devices having magnetic properties, without departing from the scope and spirit of the present invention.

What is claimed is:

1. A device having magnetic properties comprising:
   a main pole configured to conduct a magnetic flux away from the device;
   a return pole spaced apart from the main pole and configured to conductively return the magnetic flux to the device, the return pole comprising:
      at least one multilayer block having a plurality of alternating layers of magnetic material and non-magnetic material, wherein each multilayer block includes at least one non-magnetic material layer positioned between first and second magnetic material layers; and a third magnetic material layer coupled to the at least one multilayer block such that the at least one multilayer block is positioned in closer proximity to the main pole than the third magnetic material layer, wherein the third magnetic material layer has a permeability that is greater than a permeability of the at least one multilayer block.

2. The device of claim 1, wherein each multilayer block comprises a thickness that is less than a distance between the device and a storage media.

3. The device of claim 1, wherein the third magnetic material layer stabilizes an orientation of the at least one multilayer block.

4. The device of claim 1, wherein each multilayer block provides anti-ferromagnetic coupling between adjacent multilayer blocks and provides anti-ferromagnetic coupling to the third magnetic material layer.

5. The device of claim 1, wherein the layers of magnetic material in each multilayer block comprise a thickness greater than the layers of non-magnetic material in each multilayer block.

6. The device of claim 1, wherein each multilayer block that is located closer to the third magnetic material layer has a greater permeability than each multilayer block that is located further from the third magnetic material layer.

7. The device of claim 1, wherein the magnetic material layers of each multilayer block comprises at least one of a nickel iron alloy, CoNiFe and CoFe.

8. The device of claim 7, wherein the non-magnetic material layers of each multilayer block comprises at least one of Ru and Cu.

9. The device of claim 8, wherein the third magnetic material layer comprises at least one of a nickel iron alloy, CoNiFe and CoFe.

10. The device of claim 1, wherein the return pole is spaced apart from a leading edge of the main pole.

11. The device of claim 1 and further comprising a second return pole that comprises:

a plurality of alternating layers of magnetic and non-magnetic material; and a first magnetic material layer coupled to the plurality of alternating layers, wherein the first magnetic material layer has a permeability greater than the permeability of the plurality of alternating layers.

12. The device of claim 11, wherein the first magnetic material layer is positioned further from the main pole than the plurality of alternating layers.

13. The device of claim 11, wherein the second return pole is spaced apart from a trailing edge of the main pole.

14. A transducer comprising:

a first element comprising:

a first magnetic material layer;

a plurality of mutually attached multilayer blocks coupled to the first magnetic material layer, each multilayer block having a plurality of alternating layers of magnetic material and non-magnetic material that includes at least one non-magnetic material layer positioned between second and third magnetic material layers;

wherein the first magnetic material layer has a permeability that is greater than the plurality of mutually attached multilayer blocks; and a second element spaced apart from the first element by a gap, wherein the plurality of mutually attached multilayer blocks of the first element are positioned in closer proximity to the gap than the first magnetic material layer of the first element.

15. The transducer of claim 14, wherein each of the plurality of mutually attached multilayer blocks comprises a thickness that is less than a distance between the element and a storage media.

16. The transducer of claim 14, wherein the layers of magnetic material in each of the plurality of mutually attached multilayer blocks comprise a thickness greater than the layers of non-magnetic material in each of the plurality of mutually attached multilayer blocks.

17. The transducer of claim 14, wherein each of the plurality of multilayer blocks that are located closer to the first magnetic material layer has a greater permeability than each of the plurality of multilayer blocks that are located further from the first magnetic material layer.

* * * * *

UNITED STATES PATENT AND TRADEMARK OFFICE
CERTIFICATE OF CORRECTION

PATENT NO. : 7,369,360 B2 Page 1 of 1
APPLICATION NO. : 10/982077
DATED : May 6, 2008
INVENTOR(S) : Vladyslav Alexandrovish Vas'ko et al.

It is certified that error appears in the above-identified patent and that said Letters Patent is hereby corrected as shown below:

Title page, Item (56) References Cited, Other Publications, please insert the following --Jackson, J., "Classical Electrodynamics - 3rd Edition", John Wiley & Sons, Inc., Chapter 6, pages 237-239, 1999.--

Signed and Sealed this

Twenty-second Day of July, 2008

JON W. DUDAS
*Director of the United States Patent and Trademark Office*